US006562096B1

(12) United States Patent
Price et al.

(10) Patent No.: US 6,562,096 B1
(45) Date of Patent: May 13, 2003

(54) MANAGEMENT OF ELECTRIC ARC FURNACE DUST THROUGH A BASIC OXYGEN FURNACE

(75) Inventors: Kenneth S. Price, Zionsville, IN (US); Kim Lenti, South Holland, IL (US)

(73) Assignee: Heritage Environmental Services, LLC, Indianapolis, IN (US)

( * ) Notice: Subject to any disclaimer, the term of this patent is extended or adjusted under 35 U.S.C. 154(b) by 0 days.

(21) Appl. No.: 10/068,656

(22) Filed: Feb. 6, 2002

(51) Int. Cl.[7] ................................................ C21B 15/00
(52) U.S. Cl. ........................................ 75/10.38; 75/569
(58) Field of Search ................................ 75/10.38, 569

(56) References Cited

U.S. PATENT DOCUMENTS

| | | | | | |
|---|---|---|---|---|---|
| 3,770,416 | A | * | 11/1973 | Goksel | 75/487 |
| 4,673,431 | A | * | 6/1987 | Bricmont | 423/200 |
| 5,554,207 | A | * | 9/1996 | Bogdan et al. | 75/500 |
| 5,667,553 | A | * | 9/1997 | Keegel, Jr. | 423/108 |
| 5,855,645 | A | * | 1/1999 | Myerson et al. | 75/419 |
| 6,083,294 | A | * | 7/2000 | Hara et al. | 75/10.38 |
| 6,221,124 | B1 | * | 4/2001 | Blom | 75/10.22 |

OTHER PUBLICATIONS

“Recycling Steel Mill Waste”, from Steel Mill Waste—EAF Dust Recycling in Brick. 4 pages. 1995.*

PPC 9444.1986(33) “Electric Arc Furnace Dust after Encapsulation Treatment Process”. Dated Dec. 29, 1986. A letter from the Assistant Administrator from the Environmental Protection Agency to the Honorable Lloyd Bentsen. 2 pages.*

40 CFR Ch. 1 Section 261.32, “Hazardous Wastes from Specific Sources”, Jul. 1, 1999 edition, pp. 30–33.*

* cited by examiner

*Primary Examiner*—Roy King
*Assistant Examiner*—Andrew Wessman
(74) *Attorney, Agent, or Firm*—Baker & Daniels

(57) ABSTRACT

A method of processing electric arc furnace (EAF) dust which involves processing the EAF dust through a basic oxygen furnace (BOF). The method encompasses recovery of iron value from the EAF dust and the concentration of zinc into a material that has more flexible opportunities for its use as a feed to zinc manufacturing processes. The iron and zinc values in the EAF dust can be added to existing iron oxide recovery processes. This allows the EAF dust to be used as a substitute iron feed for BOF's. The method of processing EAF dust and the components thereof results in the reduction of the burden for the regulatory tracking of EAF dust. In addition, the method of processing EAF dust provides economic savings which result from the reduction of processing fees and the recovery of the value of iron and zinc materials.

18 Claims, 1 Drawing Sheet

MANAGEMENT OF ELECTRIC ARC FURNACE DUST THROUGH A BASIC OXYGEN FURNACE

TECHNICAL FIELD

The present invention relates to electric arc furnace dust, and more particularly to a method of managing the industrial handling of electric arc furnace dust.

BACKGROUND ART

Electric Arc Furnace (EAF) dust is a waste material that is generated during the production of steel in electric arc furnaces. During the production of steel, EAF dust is captured and collected for either disposal or recycle.

The major components in EAF dust are iron (up to 50 wt %) and zinc (up to 30 wt %), usually in the oxide form. In addition, EAF dust contains smaller quantities of calcium, magnesium, manganese, chloride, lead, cadmium and other trace elements. The steel industry generates about 30 to 40 pounds of EAF dust for each ton of steel produced in electric arc furnace facilities. The estimated generation of EAF dust in the United States in 1997 was approximately 900,000 tons with about 40% being disposed in landfills.

EAF dust is a listed hazardous waste (K061) under United States environmental regulations. Under this regulatory program, EAF dust is subject to specific record keeping, handling requirements and processing costs when it is recycled or disposed.

However, EAF dust contains significant quantities of iron that make it valuable for use directly in steel making processes as a substitute for other iron containing materials such as scrap steel, hot metal, sinter dust, basic oxygen furnace ("BOF") sludge and other iron oxides present at steel making facilities. In addition, EAF dust also contains significant quantities of zinc which makes it valuable as a feed for zinc manufacturing processes.

Present methods for handling EAF dust include processing it in Waelz Kilns, rotary hearth furnaces, and flame reactor processes to recover zinc. EAF dust is also subject to stabilization processes followed by landfill disposal.

Generally, it can be economical to subject EAF dust having a high zinc content to existing zinc recovery procedures, and send EAF dust having a low zinc content to landfills for disposal as a waste.

Other process methods for recovering zinc and/or iron from EAF dust have been attempted with limited success. Such processes include thermal processes, hydrometallurgical processes or combinations thereof. In most cases these processes were not successful because they are expensive to build, expensive to operate and/or they cannot be used to process all of the EAF dust material, so that waste material remains that still must be disposed.

In addition, all processes are subject to significant environmental regulatory requirements under the Resource Conservation and Recovery Act ("RCRA"). This is due to the fact that current processes have been specifically developed for the sole purpose of processing EAF dust as a hazardous waste. To date, those in the steel industry view EAF dust as a listed hazardous waste, and accordingly conclude that using EAF dust as any type of feed or reactant will necessarily result in the formation, generation or preservation of a hazardous material.

Southwick, "Recovery of Iron and Zinc From Steel Mill Wastes," a presentation from a Conference Organized by Gorham/Inertech in Pittsburgh. Pa. on May 17–19, 1999 provides a summary of various processes proposed to recover iron and zinc from mill wastes. In addition, U.S. Pat. Nos. 4,605,435, 5,013,532, 5,082,493, 5,435,835, 5,439,505, 5,493,580, 5,538,532, 5,667,553, 5,879,617, 5,993,512, 6,102,982, 6,120,577, and 6,221,124 are directed to various methods and apparatus for processing EAF dust.

The present invention is directed to a method of managing the industrial handling of electric arc furnace dust which involves the use of a BOF.

DISCLOSURE OF THE INVENTION

According to various features, characteristics and embodiments of the present invention which will become apparent as the description thereof proceeds, the present invention provides a method of managing the handling of electric arc furnace dust which involves:

- identifying a source of electric arc furnace dust;
- obtaining electric arc furnace dust from the source of electric arc furnace dust;
- providing facility having a basic oxygen furnace, which basic oxygen furnace receives an iron containing feed and produces an iron product and a sludge/dust byproduct; and
- feeding the obtained electric arc furnace dust into the basic oxygen furnace as a feedstock to recover iron from the electric arc furnace dust.

The present invention further provides a method of operating a basic oxygen furnace which involves:

- providing a facility having a basic oxygen furnace, which basic oxygen furnace receives an iron containing feed and produces an iron product and a sludge/dust byproduct;
- receiving electric arc furnace dust from at least one source of electric arc furnace dust;
- feeding the electric arc furnace dust into the basic oxygen furnace as a feedstock to recover iron from the electric arc furnace dust and to concentrate a zinc component of the electric arc furnace dust in the saleable byproduct, formerly the sludge/dust.

BRIEF DESCRIPTION OF DRAWINGS

The present invention will be described with reference to the attached drawing which are given as non-limiting examples only, in which.

BEST MODE FOR CARRYING OUT THE INVENTION

Figure 1:
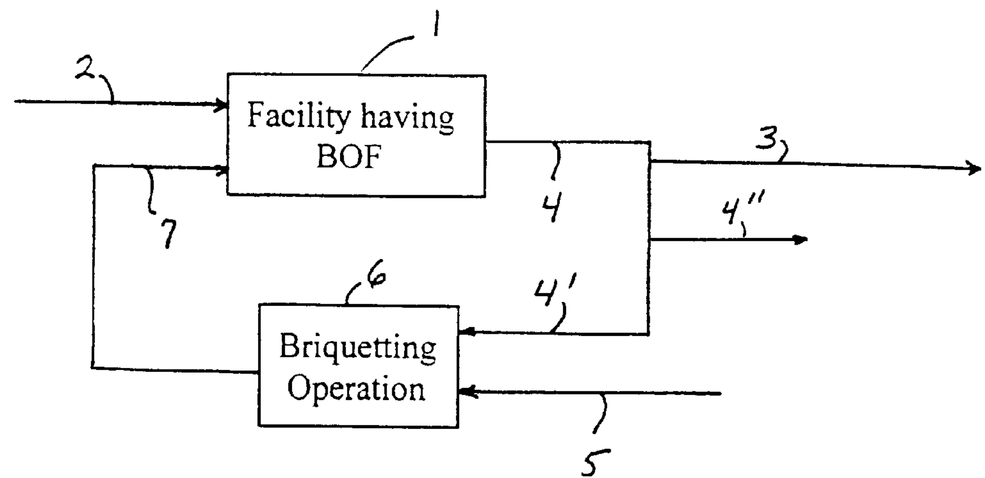
FIG. 1 is a flow diagram which illustrates one method of operating a basic oxygen furnace according to one embodiment of the present invention.

The present invention involves a management method for the handling and processing of EAF dust from an electric arc steel making operation through an iron recovery process at a basic oxygen furnace steel making process. The enhancements provided by this management method and the processes paired up thereby include both an increased volume of iron available for processing and the production of a higher zinc content product that is more attractive for use as a feed for zinc recovery and/or manufacturing. These features can be adapted and implemented with a minimal investment of capital by using existing infrastructures available at BOF facilities.

There are numerous reasons which support the feasibility for commercial success of the present management method. For example, by processing EAF dust through an existing iron recovery process as a substitute or partial substitute for other feed materials or reactants, the EAF dust would no longer be considered a listed hazardous waste in the United States under RCRA waste rules. Such processing would therefore serve the purpose of eliminating a significant regulatory burden on the generator of the EAF dust and would fulfill the goal of RCRA by enhancing the recovery of resources from materials that had been previously considered to be waste materials.

Another factor that supports the feasibility for commercial success of the present management method involves the fact that at the present time EAF dust generators must pay a processing fee to process or dispose of the EAF dust. In this regard, the ability to have EAF dust processed, even for a fee, is limited by the zinc concentration of the EAF dust. The processing fee for lower zinc concentration dusts is sufficiently high to preclude recycle for zinc recovery. Accordingly, many EAF dust generators prefer to have their EAF dust stabilized to meet disposal standards prior to sending it to landfills. According to the present invention, the EAF dust is processed so that its zinc concentration is increased. Thus, while it may not eliminate the processing fee, the management method of the present invention makes it possible for EAF dusts with lower zinc content to be processed instead of disposed in landfills.

Another factor that supports the feasibility for commercial success of the present management method involves the fact that the zinc concentration of the material produced by BOF facilities will increase to levels which will allow more options for processing the zinc rich product for recovery of the zinc. The higher concentration of zinc in these materials will be attractive for use in a wider variety of zinc manufacturing facilities.

The present invention is directed to a management process that takes advantage of the fact that, if a material can be used as a substitute for other raw materials in an existing process, it is not a waste and therefore in the United States cannot be a hazardous waste subject to RCRA regulations. A similar approach may apply or be adapted in other countries' regulations.

According to the management method of the present invention, waste iron oxides, contained in the EAF dust, are actively recovered in basic oxygen furnace (BOF) steel making facilities as substitutes for, or in addition to, hot metal and steel scrap that is fed into BOF's.

This recovery can be accomplished by first making or incorporating the EAF dust into a suitable form that can be charged into the furnace in a manner acceptable to the manufacturing facility. For example, the EAF dust can be combined with other materials including other iron oxide materials and formed into briquettes or pellets using conventional briquetting or pelletizing procedures and apparatus. It is also possible to inject the EAF dust into a furnace without subjecting it to briquetting or pelletizing procedures.

BOF facilities also generate dust during their operation that is typically captured in wet scrubber systems. These wet scrubbers produce a sludge that contains the same metals as EAF dust, but usually in lower concentrations. The concentrations of volatile metals in the sludge (e.g., zinc, lead and cadmium) depend on the concentrations of these compounds in the materials charged to a BOF unit. Typically volatile metals charged to a BOF will be captured and collected in the dust control system and end up in the BOF sludge. As the BOF sludge is reused in the process, the concentration of these compounds will build up. The addition of EAF dust to the BOF process will not change the basic list of compounds in the BOF sludge, it will only increase the rate at which they concentrate in the system.

Since the recovery of iron value from EAF dust is no different than the present practice of recovering iron value from other iron oxide materials at steel making facilities, the substitution or addition of EAF dust into BOF iron recovery processes would cause EAF dust to be a feedstock rather than being considered a waste. If the EAF dust is not a waste, it could no longer be considered a hazardous waste.

In addition to re-characterizing EAF dust from a waste or hazardous waste to a feedstock, the process for recovering iron value from EAF dust would have the added advantage of increasing the zinc concentration in the sludge collected in the dust collection system for the BOF. The BOF sludge would continue to be returned to the BOF process to maximize the iron recovery until the zinc content of the sludge reaches a point where the recovery process attains a desired economic operating condition or the zinc concentration reaches the practical limits for the operation of the BOF. Since BOF sludge with a higher zinc content results in a material that has a higher value for use in zinc manufacturing processes (i.e. provides more flexibility for the use), zinc enriched materials derived from the process of the present invention become more valuable raw materials for other processes.

The value of the present invention to an EAF operator comes from the elimination of waste being processed and sent to landfills. This provides a reduction in environmental impact.

Within the hazardous waste regulatory system of the United States the processing of EAF dust in a BOF facility according to the present invention to both recover iron and improve the value of the zinc fraction would eliminate it from the "listed waste" category for hazardous wastes. The value of having the EAF dust that is subject to the management method of the present invention eliminated from the "listed waste" status would be a significant advantage for the generators of EAF dust and would allow zinc manufacturers to more easily use the zinc rich product.

The value of the present invention to an operator of a BOF steel making facility comes from both the value of the iron recovered in the BOF facility and the fact that a more marketable zinc product will be produced in the BOF sludge from the process. The combination of the iron value and the improved value of the zinc rich BOF sludge would allow the operator of the recovery process to make a higher profit.

The management method of the present invention includes a variety of alternatives embodiments, each of which is based upon the principles set forth above. Application of various ones of the alternatives embodiments can be particularly useful to parties to business transactions, depending on the ownership of EAF and BOF facilities, the concentration of iron and zinc components of the initial EAF dust and the options available for the use of zinc material produced by a BOF.

FIG. 1 is a flow diagram which illustrates one method of operating a basic oxygen furnace according to one embodiment of the present invention. In FIG. 1, a facility having a basic oxygen furnace (BOF) 1, receives a conventional feed 2 for producing a steel product shown as output 3. During production of steel, a BOF sludge/dust byproduct is also produced and shown as output 4. The BOF sludge/dust byproduct 4 can be processed to recover zinc.

According to the present invention, electric arc furnace dust (EAF dust) is used as a feed stock 5 for the modified steel processing operation. In the embodiment of the present invention that is depicted in FIG. 1, the EAF dust feedstock 5 is combined with a portion of the BOF sludge/dust byproduct 4' and feed to a briquetting operation 6. The resulting briquettes are feed into the BOF 1 as an additional feed 7.

The feed 2 of the BOF can include hot metal obtained from iron ore, scrap iron, limestone and various alloys. In addition to the EAF dust 5 and BOF sludge/dust byproduct 4', the briquetting operation can receive conventional binders.

In operation, the portion of the BOF sludge/dust byproduct 4' returned to the BOF 1 is dependent on the zinc concentration of the BOF sludge/dust byproduct 4" that is removed for zinc processing.

FIG. 1 is merely exemplary, and it is to be understood that the EAF dust could be fed into the BOF without being combined with the BOF sludge/dust byproduct and without briquetting if desired. However, returning a portion of the BOF sludge/dust byproduct into the BOF will increase the zinc concentration in the BOF sludge/dust byproduct stream that is withdrawn.

The following are exemplary of applicational uses of management method alternatives according to the present invention. In all of the following examples, the iron recovery process at a BOF facility is defined to include the auxiliary equipment required to process iron materials into the proper form to be added to a BOF system for recovery of the iron units. It is to be understood that the following are examples are non-limiting.

EXAMPLE 1

This example involves a BOF facility that is, prior to adaption of the present invention, already recovering iron value or iron units from other sources such as BOF sludge, baghouse dust, mill scale, blast furnace sludge and other iron rich materials.

To incorporation of the use of EAF dust at such a BOF facility according to this example of the present invention, the BOF facility would charge a processing fee to the producer of the EAF dust to dispose of the EAF dust. The BOF facility would then add the EAF dust to the BOF for purposes of recovering the iron as discussed above. The iron value from the EAF dust would be recovered by the BOF facility and optionally shared with the EAF dust producer or used to off-set the EAF dust processing fee charged to the EAF dust producer.

As the zinc concentration of the material exiting the BOF facility increases, a portion of it would be removed for sale as a zinc process feed material. The proceeds from the sale of the zinc product could also be realized by the BOF facility or shared with the EAF dust producer or used to off-set the EAF dust processing fee charged to the EAF dust producer as in the case of the iron value.

This management method encompasses several EAF dust producers who use a common BOF facility to process their EAF dust. In such a case the values of the iron and zinc recovered could be distributed among the participants in any suitable manner.

In this example, the zinc concentration of the EAF dust will determine the relationship between the quantity of EAF dust processed by the BOF and the quantity of BOF sludge that is removed from the system for sale as high zinc content feedstock. For example, if 300 tons of EAF dust with a zinc concentration of 10% is added to the BOF, a total of 30 tons of zinc would have been added. In order to remove this quantity of zinc from the process a quantity of 100 tons of BOF sludge with 30% zinc would have to be removed. That means, in this example, that a quantity of BOF sludge equal to approximately one third of the quantity of EAF dust processed would have to be removed to keep the system in balance. As the zinc content EAF dust and BOF sludge changes, this ratio would change in the same proportions. This same relationship applies to all of the examples set forth herein.

EXAMPLE 2

This example involves a steel making facility that has both EAF and BOF steel making processes, either at the same location or at facilities that are owned by the same company. Such a company, not employing the present invention, may pay a processing fee to dispose of EAF dust to a third party or could conceivable process the EAF dust in a manner different from the present invention. In this example, if the facility has an iron oxide recovery operation in place that involves the use of a BOF, but has not previously realized the concepts of the present invention, in order to practice the present invention, the owners of the facility would add the EAF dust to a BOF of an iron oxide recovery operation, resulting in the savings of the EAF dust processing fee that is presently being charged or incurred in some other manner.

If EAF dust were brought in from a location not owned by the BOF facility, the BOF facility could charge a processing fee to the producer(s) of the EAF dust for managing the material at the iron recovery system. As the zinc concentration of the material exiting the BOF facility increases, a portion would be removed for sale as a zinc process feed material.

EXAMPLE 3

This example involves a BOF facility similar to the one in Example 1, except that no existing auxiliary equipment or process to recover the iron units at the BOF are in place. In this example the equipment for an iron oxide recovery system could be installed to use the iron oxide material generated from the BOF operation and EAF dust brought from other locations.

The facility could charge a processing fee to the producer (s) of EAF dust for adding their EAF dust to the iron recovery system. The iron value from the EAF dust would be recovered in a similar manner as the other materials being processed, and retained by the BOF or distributed among the participants as in the previous examples. As the zinc concentration of the material exiting the BOF facility increases, a portion would be removed for sale as a zinc process feed material.

EXAMPLE 4

This example involves the use of EAF dust at a BOF facility in a manner similar to example 2, except that no existing auxiliary equipment or process to recover the iron units at the BOF are in place. Such an facility, not employing the present invention, may pay a processing fee to dispose of EAF dust to a third party or could conceivable process the EAF dust in a manner different from the present invention. In this example the equipment for an iron oxide recovery system could be installed to use the iron oxide material generated from the BOF operation, EAF dust from the owner of the BOF facility, and EAF dust brought from other locations.

The EAF dust from the BOF owner would be added to the iron oxide recovery operation, resulting in the savings of the EAF dust processing fee that is presently being charged. Producers of EAF dust brought in from locations not owned by the BOF facility would be charged a processing fee for adding the EAF dust to the iron recovery system. As the zinc concentration of the material exiting the BOF facility increases, a portion would be removed for sale as a zinc process feed material.

Figure 2:
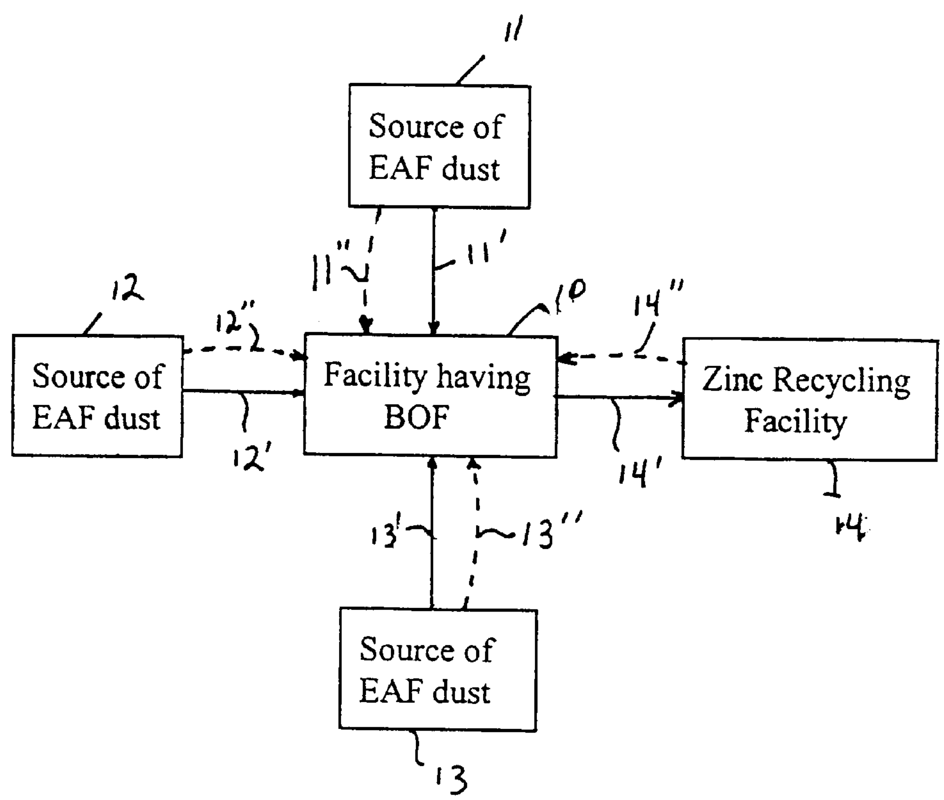
FIG. 2 is a flow diagram which illustrates one example of interplay between the economic and technological processes of the present invention.

FIG. 2 is a flow diagram which illustrates one example of interplay between the economic and technological processes of the present invention.

FIG. 2 depicts a facility having a BOF 10, which receives EAF dust from one or more sources of EAF dust 11, 12, 13, . . . etc. The flow of EAF dust is depicted by solid lines 11', 12', and 13' in FIG. 2. The facility having the BOF 10, would charge a processing fee to each of the sources of EAF dust. The value streams of the processing fees are depicted by broken lines 11", 12", and 13" in FIG. 2.

The facility having the BOF receives the EAF dust as a feedstock and produces a BOF sludge/dust byproduct having an increased zinc content as discussed above. The facility having the BOF sells the zinc-concentrated BOF sludge/dust byproduct to a zinc processing facility 14. The flow of the zinc-concentrated BOF sludge/dust byproduct is depicted by solid line 14" in FIG. 2. The zinc processing facility pay a fee to the facility having the BOF to buy the zinc-concentrated BOF sludge/dust byproduct. The value stream of the purchase fee for the zinc-concentrated BOF sludge/dust byproduct is depicted by broken line 14" in FIG. 2.

It is to be understood that FIG. 2 is merely exemplary of how the economic and technological processes of the present invention interplay and can be related. The economic aspect of the present invention can vary depending on the relationship, interests and negotiations of/between the parties having BOF furnaces and those producing EAF dust and those processing zinc from BOF sludge. Other properly rights are also factors in the overall economics of the present invention.

The EAF dust management method of the present invention creates significant value which can be distributed in numerous ways among the various participants, i.e. EAF dust producers, BOF facilities and technology owner.

The EAF dust producers can have their EAF dust processed as a feedstock for iron recovery processes, thus removing them from the burdens of certain aspects of regulatory requirements. The regulatory agencies would have a waste material removed from their lists of materials to oversee by having the EAF dust processed to recover valuable resources, rather than having it disposed in landfills. The owners of the BOF steel making facilities could receive a portion of the fees charged for processing the EAF dust, recover additional iron for their steel production operations, and produce a high zinc material that would be easier to manage for reuse than conventional byproduct materials.

In any example or embodiment of the present management method in which a processing fee is charged by the EAF dust producer(s), all or a portion of the fee could be applied to any costs associated with overall management of the EAF dust. Likewise, in any case where savings resulted from avoidance of a processing fee for EAF dust produced at the BOF owner's facilities, all or a portion of the savings could be applied to any costs associated with overall management of the EAF dust. Moreover, in any case where zinc concentrate from the process is sold, all or a portion of the proceeds (or savings) could be applied to any costs associated with overall management of the EAF dust.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above.

What is claimed is:

1. A method of processing electric arc furnace dust which comprises:

identifying a source of electric arc furnace dust;

obtaining electric arc furnace dust from said source of electric arc furnace dust, said electric are furnace dust containing volatile metals;

providing a facility having a basic oxygen furnace, which basic oxygen furnace receives an iron containing feed and produces an iron product and a sludge/dust byproduct; and feeding said obtained electric arc furnace dust and volatile metals contained therein into said basic oxygen furnace as a feedstock to recover iron from said electric arc furnace dust.

2. A method of processing electric arc furnace dust according to claim 1, wherein said identified source of electric arc furnace dust and the facility having the basic oxygen furnace comprise the same entity.

3. A method of processing electric arc furnace dust according to claim 1, wherein said identified source of electric arc furnace dust and the facility having the basic oxygen furnace comprise the different entities.

4. A method of processing electric arc furnace dust according to claim 1, wherein said identified source of electric arc furnace dust comprises a plurality of sources of electric arc furnace dust.

5. A method of processing electric arc furnace dust according to claim 1, wherein the facility having the basic oxygen furnace charges a processing fee to the identified source of electric arc furnace dust to feed the obtained electric arc furnace dust into said basic oxygen furnace.

6. A method of processing electric arc furnace dust according to claim 5, wherein said identified source of electric arc furnace dust comprises a plurality of sources of electric arc furnace dust, and the facility having the basic oxygen furnace charges each of the plurality of sources of electric arc furnace dust a processing fee to feed the obtained electric arc furnace dust into said basic oxygen furnace.

7. A method of processing electric arc furnace dust according to claim 1, wherein said step of feeding said obtained electric arc furnace dust into said basic oxygen furnace as a feedstock effects a change of classification of said obtained electric arc furnace dust from a regulated listed hazardous waste to a characteristic waste or a non-hazardous feedstock.

8. A method of processing electric arc furnace dust according to claim 1, wherein said obtained electric arc furnace dust has a zinc content and said step of feeding said obtained electric arc furnace dust into said basic oxygen furnace causes an increase in zinc concentration in a sludge/dust byproduct obtained from the basic oxygen furnace.

9. A method of processing electric arc furnace dust according to claim 2, wherein said obtained electric arc furnace dust has a zinc content and said step of feeding said obtained electric arc furnace dust into said basic oxygen furnace causes an increase in zinc concentration in a sludge/dust byproduct obtained from the basic oxygen furnace.

10. A method of processing electric arc furnace dust according to claim 3, wherein said obtained electric arc furnace dust has a zinc content and said step of feeding said obtained electric arc furnace dust into said basic oxygen furnace causes an increase in zinc concentration in a sludge/dust byproduct obtained from the basic oxygen furnace.

11. A method of processing electric arc furnace dust according to claim 5, wherein said obtained electric arc furnace dust has a zinc content and said step of feeding said obtained electric arc furnace dust into said basic oxygen furnace causes an increase in zinc concentration in a sludge/dust byproduct obtained from the basic oxygen furnace.

12. A method of processing electric arc furnace dust according to claim 6, wherein said obtained electric arc furnace dust has a zinc content and said step of feeding said obtained electric arc furnace dust into said basic oxygen furnace causes an increase in zinc concentration in a sludge/dust byproduct obtained from the basic oxygen furnace.

13. A method of processing electric arc furnace dust according to claim 1, wherein a sludge/dust byproduct is obtained from the basic oxygen furnace and at least a portion of the sludge/dust is returned into said basic oxygen furnace.

14. A method of processing electric arc furnace dust according to claim 13, wherein said obtained electric arc furnace dust has a zinc content and said step of feeding said obtained electric arc furnace dust into said basic oxygen furnace causes an increase in zinc concentration in said sludge/dust byproduct, and said step of returning at least a portion of said sludge/dust byproduct into said basic arc furnace causes said concentration of zinc in said sludge/dust byproduct to increase.

15. A method of operating a basic oxygen furnace which comprises:

providing a facility having a basic oxygen furnace, which basic oxygen furnace receives an iron containing feed and produces an iron product and a sludge/dust byproduct;

receiving electric arc furnace dust from at least one source of electric arc furnace dust, said electric arc furnace dust containing volatile metals;

feeding said electric arc furnace dust and volatile metals contained therein into the basic oxygen furnace as a feedstock to recover iron from said electric furnace dust and to concentrate a zinc component of said electric arc furnace dust in said sludge/dust byproduct.

16. A method of operating a basic oxygen furnace according to claim 15, wherein said at least one source of electric arc furnace dust and the facility having the basic oxygen furnace comprise the same entity.

17. A method of operating a basic oxygen furnace according to claim 15, wherein said at least one source of electric arc furnace dust is a different entity from the facility having the basic oxygen furnace.

18. A method of operating a basic oxygen furnace according to claim 17 wherein said at least one source of electric arc furnace dust comprises a plurality of sources of electric arc furnace dust.

* * * * *

UNITED STATES PATENT AND TRADEMARK OFFICE

CERTIFICATE OF CORRECTION

PATENT NO. : 6,562,096 B1
DATED : May 13, 2003
INVENTOR(S) : Price et al.

It is certified that error appears in the above-identified patent and that said Letters Patent is hereby corrected as shown below:

Title page, Item [54] and Column 1, line 1,
Please delete the word "MANAGEMENT" and insert the word -- PROCESSING --

Signed and Sealed this

Ninth Day of September, 2003

JAMES E. ROGAN
*Director of the United States Patent and Trademark Office*